United States Patent
Lin

(10) Patent No.: US 9,338,613 B2
(45) Date of Patent: *May 10, 2016

(54) INTELLIGENT MESSAGING SYSTEM TO CONVERT EMAIL TO SMS, EMS AND MMS

(75) Inventor: Zhijian (Jeff) Lin, Dublin, CA (US)

(73) Assignee: Cellco Partnership, Basking Ridge, NJ (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/585,452

(22) Filed: Aug. 14, 2012

(65) Prior Publication Data

US 2013/0041964 A1 Feb. 14, 2013

Related U.S. Application Data

(63) Continuation of application No. 13/186,735, filed on Jul. 20, 2011.

(51) Int. Cl.
*H04W 4/00* (2009.01)
*H04W 4/12* (2009.01)
*H04L 12/58* (2006.01)

(52) U.S. Cl.
CPC ............... *H04W 4/12* (2013.01); *H04L 12/584* (2013.01)

(58) Field of Classification Search
CPC .............. H04W 72/082; H04W 16/14; H04W 72/1215; H04W 16/32
See application file for complete search history.

(56) References Cited

U.S. PATENT DOCUMENTS

| | | | |
|---|---|---|---|
| 2007/0255792 A1 | 11/2007 | Gronberg | |
| 2007/0283039 A1* | 12/2007 | Kim et al. | 709/238 |
| 2008/0243619 A1* | 10/2008 | Sharman et al. | 705/14 |
| 2008/0263169 A1* | 10/2008 | Brabec et al. | 709/206 |
| 2010/0056118 A1* | 3/2010 | Galicia et al. | 455/414.4 |

OTHER PUBLICATIONS

Entire Prosecution of U.S. Appl. No. 13/186,735, to Zhijian (Jeff) Lin, filed Jul. 20, 2011, entitled "Intelligent Messaging System to Convert Email to SMS, EMS and MMS."

* cited by examiner

*Primary Examiner* — Keith Fang

(57) ABSTRACT

Upon receiving an email for a mobile station containing a subject and a body, the subject and body are combined into a first message. If the email contains an attachment, the first message can be converted into a MMS message. If there is no attachment, the number of characters in the first message can be counted. If the number of characters is less than or equal to a first number of characters, the first message can be converted to a SMS message. If the number is greater than the first number of characters and less than or equal to a second number of characters, the first message can be converted to an EMS message. In addition, if the number of characters is greater than the second number of characters, the first message can be converted to the MMS message.

21 Claims, 7 Drawing Sheets

INTELLIGENT MESSAGING SYSTEM TO CONVERT EMAIL TO SMS, EMS AND MMS

CROSS-REFERENCE TO RELATED APPLICATION

This application is a continuation of and claims priority from U.S. application Ser. No. 13/186,735, filed on Jul. 20, 2011, the disclosure of which is hereby incorporated by reference herein in its entirety.

BACKGROUND

In recent years, as landline and mobile communication technologies have developed, digital messages have taken various types, such as emails, Short Messaging Service (SMS) messages, Enhanced Messaging Service (EMS) messages, and Multimedia Messaging Service (MMS) messages. Each message type has its own limitations. For example, a SMS message can typically only transmit 160 characters in each message. Further, the message cannot contain attachments or graphics. This type of message is the least expensive type of text message for the cellular telephone service to send through their network in terms of network resources and cost to the user. EMS messages are typically an extension of SMS messages. EMS messages allow small graphics, melodies, animations and long, formatted text (such as bold or italic) messages of approximately 1000 characters to be transmitted. The cost to transmit, in both resources and user cost, an EMS message is greater than that for a SMS message. An MMS message is similar to a standard e-mail in which it has no character limits and can transmit attachments. However, a MMS message is, out of the three listed above, the most expensive type of text message that can be sent over the wireless network, in terms of resources and cost to the user.

Currently, cellular network providers provide separate domains for each type of message. For example, Verizon Wireless has separate domains such that an email sent to the MDN@vtext.com address ("MDN" is the Mobile Directory Number of the mobile station being messaged) is converted into a SMS message: While an email sent to the MDN@vzwpix.com address is converted into a MMS message, which is delivered to the mobile station with the listed MDN. SMS messages and MMS messages are sent using different servers and protocols, which is the root of the separate domains.

However, it is inconvenient for the senders of email messages to remember different email domains in order to send different types of messages. When a sender uses the "wrong" email domain, errors can occur or messages can be truncated because the "wrong" message service is used. Examples are attempting to send a message with large attachments or that exceeds 160 characters as a SMS message. Also, the user can be charged a premium for a MMS message that could have been sent as a SMS message, based on character length. While the cellular network provider recovers a premium for the MMS message, the message is taking resources that it does not necessarily require, which may cause capacity issues with the provider's network.

Hence a need exists for simplifying the email domains to a single domain and add a method and device to determine the type of message that is sent and convert it accordingly.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. In other instances, well known methods, procedures, components, and/or circuitry have been described at a relatively high-level, without detail, in order to avoid unnecessarily obscuring aspects of the present teachings.

The various examples disclosed herein relate to using a common domain for all messaging to a mobile station, regardless of whether it is a SMS, EMS, or MMS message.

Figure 1:
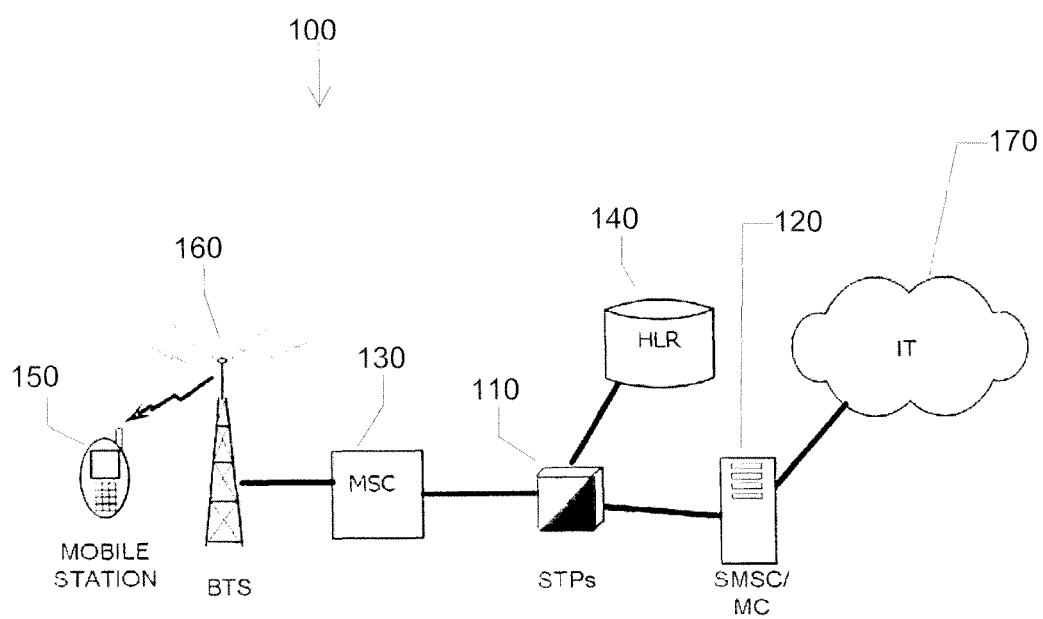
FIG. 1 is a functional block diagram that describes a various components of a mobile network used to implement a SMS message service.

Reference now is made in detail to the examples illustrated in the accompanying drawings and discussed below. FIG. 1 a block diagram of a number of wireless network components that are used to implement SMS messaging. As noted above, cellular network providers developed SMS to transmit text messages for display on mobile stations. In many existing network architectures, the SMS traffic uses the signaling portion of the network 100, through routers referred to as Signaling Transfer Points (STPs) 110. SMS traffic normally goes to/from a SMSC (Short Message Service Center) 120 which is one type of Message Center (MC). The STPs 110 provide communications between the SMSCs 120 and a mobile switching center (MSC) 130 as well as between the SMSCs 120 and a Home Location Register (HLR) 140.

An SMS message includes source and destination address fields. For messages from a user device, the source address is the mobile directory number (MDN) of the sending customer's mobile station or the email address of the sender. The destination address may be a MDN of a destination mobile station 150 or some other form of recognizable address. The HLR 140 stores a record associated with the destination mobile station's MDN for information about the mobile station 150 that is needed to route the message to the mobile station at its current location. The network then routes a SMS message with the MDN destination address all the way through to the addressed mobile station 150, wirelessly sent by a base transceiver system (BTS) 160 which communicates via an antennae system at the site of a base station. For SMS messages originating at a mobile station, a MSC determines where to route the message, typically to one of several SMSCs 120 deployed in the network 170 to then follow the path outlined above.

While the above outlines the procedure for handling a SMS message. An almost identical procedure is used to transmit an EMS message. EMS messages are handled using the SMSCs 120. For MMS messages, a Multimedia Message Service Center (MMSC) routes the MMS message to a Packet Data Serving Node (PDSN). The PDSN provides access to the Internet, intranets and application servers for the mobile station (discussed below).

Figure 2:
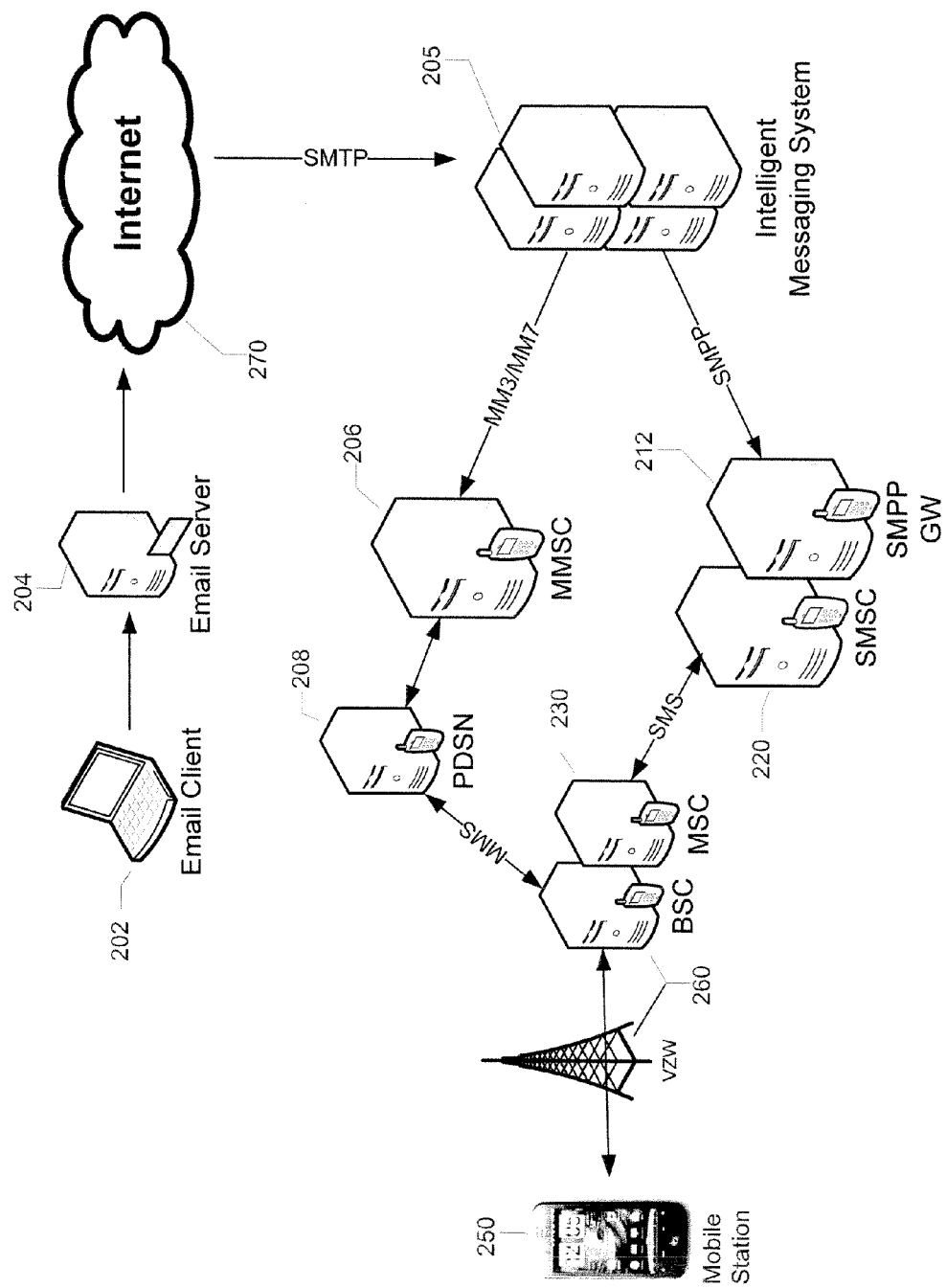
FIG. 2 is a functional block diagram that describes a various components of an example of a mobile network used to implement an example of an intelligent messaging system.

FIG. 2 illustrates a block diagram of an example of an intelligent messaging system routing a message. A user at a mobile station or other computer with an email client 202 prepares and sends an email message with a universal message domain (e.g. MDN@messaging.vzw.com) to a user's mobile station 250. The message is transmitted to an email server 204 and then transmitted over a network 270 (e.g. the Internet) and is ultimately received by an intelligent messaging system 205. The intelligent messaging system 205 processes the email, as explained below, and then routes it based on the processing. For emails determined to be a SMS or an EMS message, the email is sent to Short Message Peer-to-Peer (SMPP) Gateway (GW) 212 and SMSC 220. At the SMSC 220 the email is formatted accordingly as a SMS or an EMS message and then forwarded to the MSC 230 and the Base Station Controller (BSC) 260 to be delivered to the appropriate mobile station 250. Note that the BSC 260 can perform management functions for the BTS 160.

If the intelligent messaging system 205 determines that email is a MMS message, it transmits the email to the MMSC 206. The MMSC 206 processes the email accordingly and transmits the MMS message to the PDSN 208. The PDSN 208 transmits the MMS message to the MSC 230/BSC 260 to be delivered to the appropriate mobile station 250.

Further, FIG. 2 illustrates examples of the protocols used as the email message travels through the system to finally reach the mobile station 250. The email message can be transmitted over the Internet 270 to the intelligent messaging system 205 using the Simple Mail Transfer Protocol (SMTP). If the intelligent messaging system 205 determines that the email should be a SMS message, it transfers the email using the SMPP protocol. The SMSC 220 converts the email to a SMS message before forwarding it to the MSC 230. Traveling the MMS path, the intelligent messaging system 205 transmits the email to the MMSC 206 using the MM3 or MM7 protocols. The MM3 protocol is used to interface between the email server 204 using SMTP and the MMSC 206. The MM7 protocol is used to communicate with a value-added service provider (not illustrated) and the MMSC 206. The value-added service provider can be, for example, a bank sending a statement or an advertiser sending publicity, to include in the MMS message. The MMSC 206 communicates with the PDSN 208, who in turn communicates with the BSC 260/MSC 230 using the MMS message protocol to send the message to the mobile station 250.

Figure 3A:
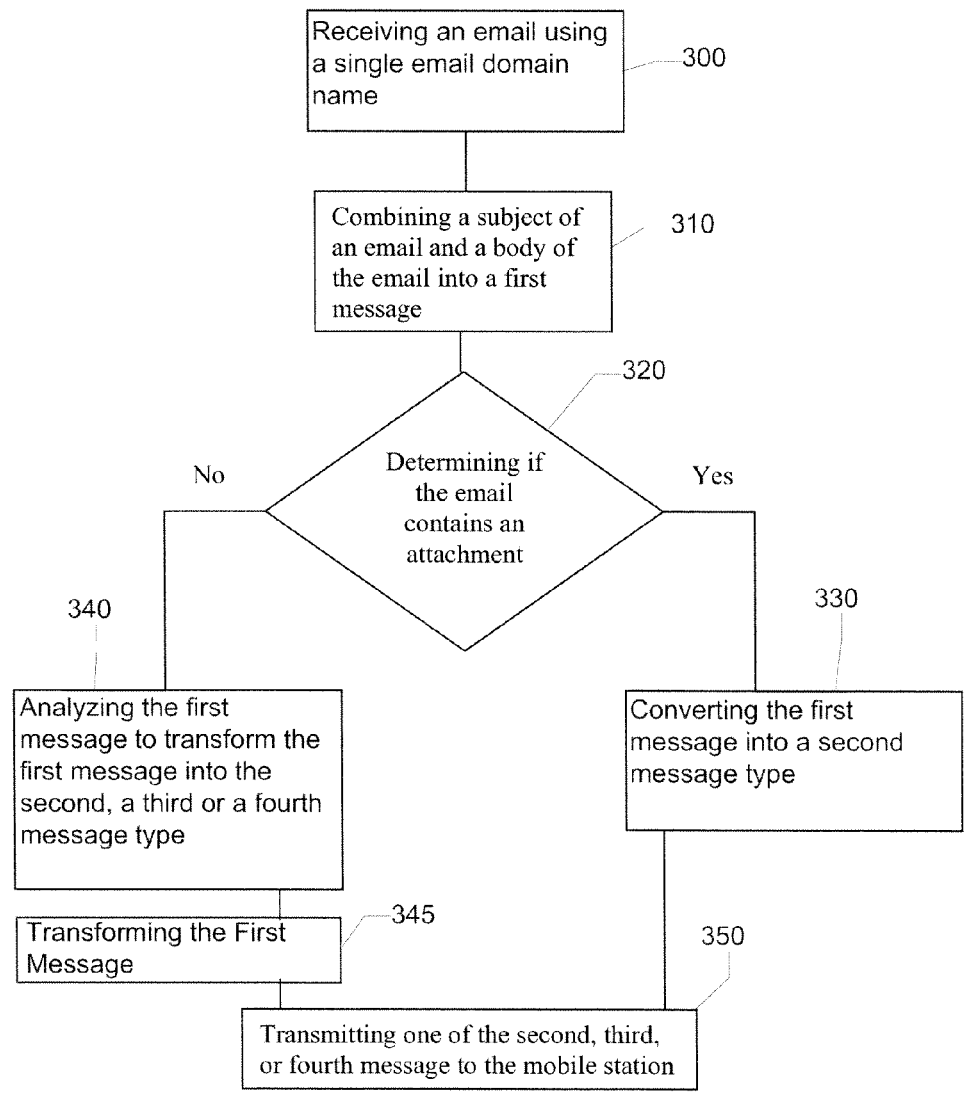
FIGS. 3A and 3B are flow diagrams describing an example of the processing of messages by the intelligent messaging system.
Figure 3B:
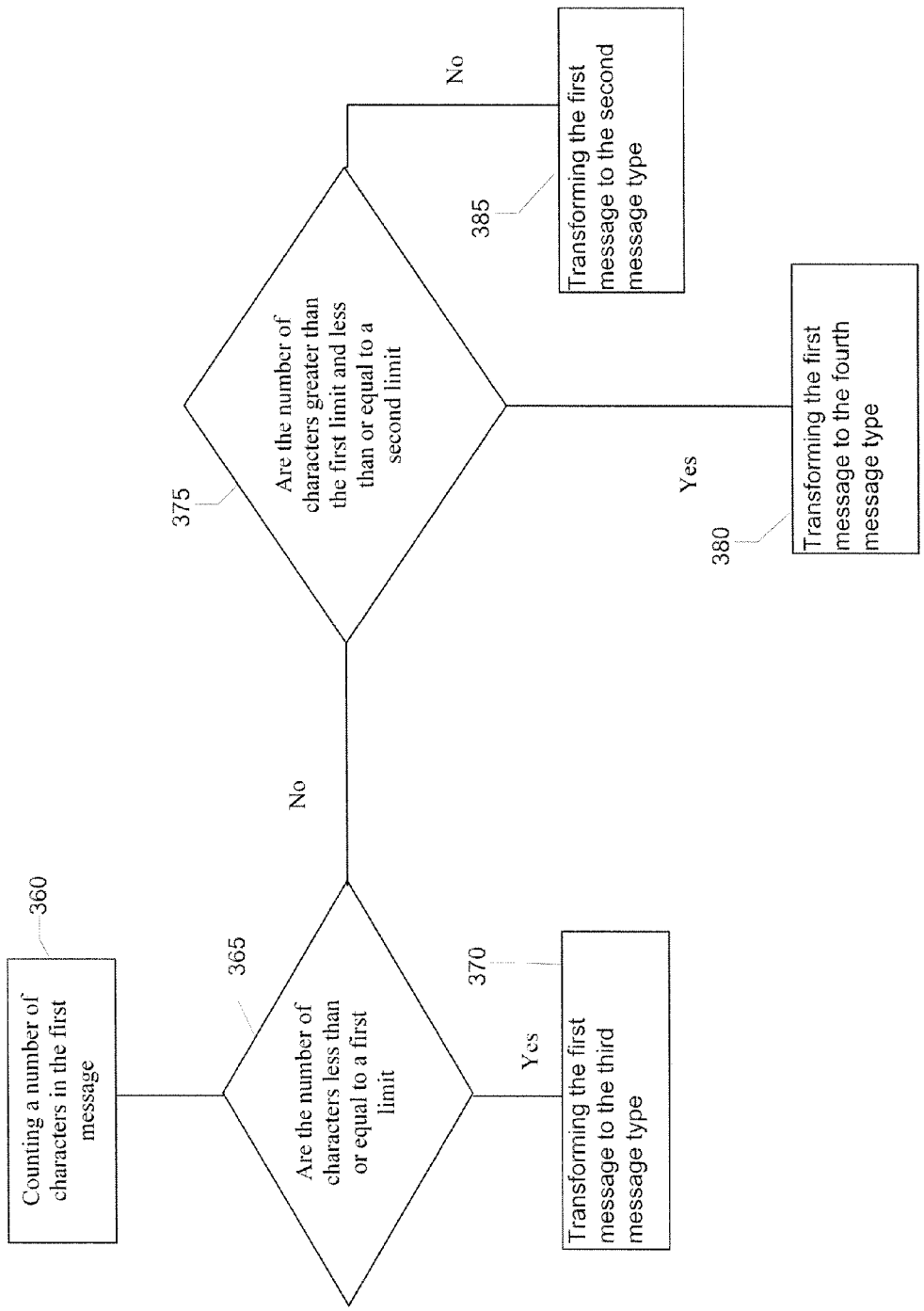

FIG. 3A and FIG. 3B illustrate an example of a method of determining a message protocol for the mobile station 250. FIG. 3A illustrates the handling an email having an attachment. The intelligent messaging system 205 receives an email sent from the email server 204 using a single email domain name (step 300), i.e. MDN@message.com. Typical emails have a subject line and a message body. The intelligent messaging system 205 combines the text of the subject line with the text of the body into a first message (step 310). In another embodiment, the message can also include the sender's email address and a callback number. The intelligent messaging system 205 then determines if the email contains an attachment (step 320). The attachment can be any type of file, picture, video, text, ring tone, wallpaper, application, etc. and any size. If the email contains the attachment, the first message is converted into a second message type having a first protocol (step 330). If the email does not contain the attachment, the first message is analyzed to select into which of different types of messages to transform the first message, the second message type, a third message type or a fourth message type (step 340). The first message is then transformed into the second, third, or fourth message type, having at least a second protocol, based on the analysis (step 345). Once the first message is converted to one of a second, third or fourth message type, the second, third or fourth message type is transmitted to the mobile station (step 350).

In relation to the system illustrated in FIG. 2, the intelligent messaging system 205 is performing most of the steps above (300, 310, 320), through in some examples tasks can be distributed across multiple systems. Once the determination is made, the intelligent messaging system 205 communicates with either the MMSC 206 or the SMSC 220. The communication is in MM3 or MM7 protocol for the first message that is converted to a MMS message. The communication is in SMPP protocol for the first message that is converted to a SMS or EMS message. The MMSC 206 and SMSC 220 make the final conversion to the particular type or format of the message (steps 330, 340). Once in the particular respective format, the MMSC 206 or the SMSC 220 transmit the message to the BSC 260/MSC 230 to be transmitted to the receiving mobile station 250.

FIG. 3B illustrates the method to handle messages that do not have an attachment as indicated in FIG. 3A by step 340. This is one example of the analysis the intelligent messaging system 205 is performing. The intelligent messaging system 205, after determining in step 320 that the email does not have an attachment, counts the number of characters in the first message (step 360). Comparing the number of characters to a first limit, and if the number of characters is less than or equal to the first limit (step 365), the first message is converted to a third message type having a second protocol (step 370). In an example the first limit can be between 140 and 160 characters. If the message is, for example, 130 characters (this is the total of the combination of the subject text and the body text of the email that was converted), the system converts the message to a SMS message with a SMS protocol.

Comparing the number of characters to a first and second limit, and if the number of characters is greater than the first limit and less than or equal to a second limit (step 375), the first message is converted to a fourth message type having a third protocol (step 380). As above, the first limit can be between 140 and 160 characters while the second limit can be approximately 1000 characters. If the character count comes between these values, the message can be converted to an EMS message, having an EMS protocol. As noted above, EMS messages are also handled by the systems that handle SMS messages.

If the message's number of characters is greater than the second limit (e.g. approximately 1000 characters), the first message is converted to the second message type having the first protocol (step 385). Thus, the method performs a first conversion of the email to a common format (for example, MM3 or MM7 format for MMS message), analyzes the message for attachments and character count, and determines the most efficient of the at least 3 messaging protocols to send the message. In this manner, users are assured that they receive the entire message (no character truncation as is common in SMS messaging or missing attachments) for the lowest price. Additionally, the cellular network provider is using his limited resources more efficiently by only sending messages that require the greater resources by the greater resource consuming method.

A further example is an article of manufacture that includes at least one machine readable storage medium having programming instructions embodied thereon. The instructions are for execution by one or more computers, wherein the programming configures the computers to be capable of performing functions for messaging services in a system. The functions performed by the programming instructions are similar to the steps above and illustrated in FIGS. 3A, 3B, and 4.

Figure 4:
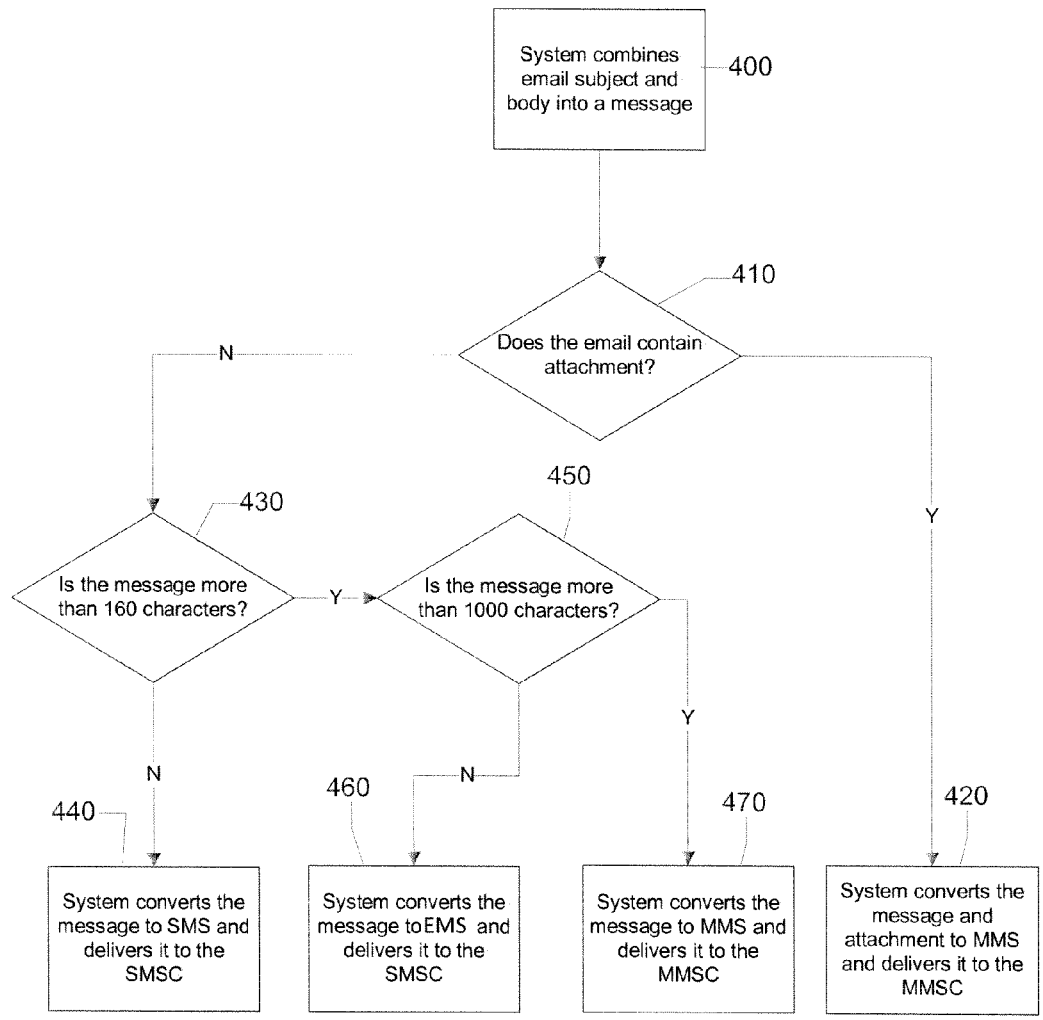
FIG. 4 is a flow diagram describing another example of the processing of messages by the intelligent messaging system.

FIG. 4 illustrates another example of how the intelligent messaging system 205 analyzes an incoming email to determine what type of message protocol should be used. The intelligent messaging system 205 receives the email and combines the subject line of the email with the body of the email and coverts it into a message (step 400). The intelligent messaging system 205 then determines if the email contains an attachment (step 410). If the email does contain an attachment, the message and the attachment are converted to the MMS protocol (e.g. MM3 or MM7) and sends the MMS message to the MMSC 206 (step 420).

If the intelligent messaging system 205 determines that the message does not contain an attachment (step 410) it then counts the number of characters. The intelligent messaging system 205 first checks if the message has more than 160 characters, or whatever limit for SMS messaging is set (step 430). If the message has less than, or equal to, 160 characters, the system converts the message into a message having the SMS protocol and transmits it to the SMSC 220 (step 440). If the message has more that 160 characters, the intelligent messaging system 205 determines if the message has more than 1000 characters (step 450). If the message is equal to or less than 1000 characters, then the intelligent messaging system 205 converts the message into an EMS message and transmits the EMS message to the SMSC 220 (step 460). If the message is more than 1000 characters, the message is converted into a message having the MMS protocol and is sent to the MMSC 206 (step 470).

To perform the character count, in one example, the intelligent messaging system 205 opens the message and counts all characters, including letters, numbers, spaces, and symbols.

Figure 5:
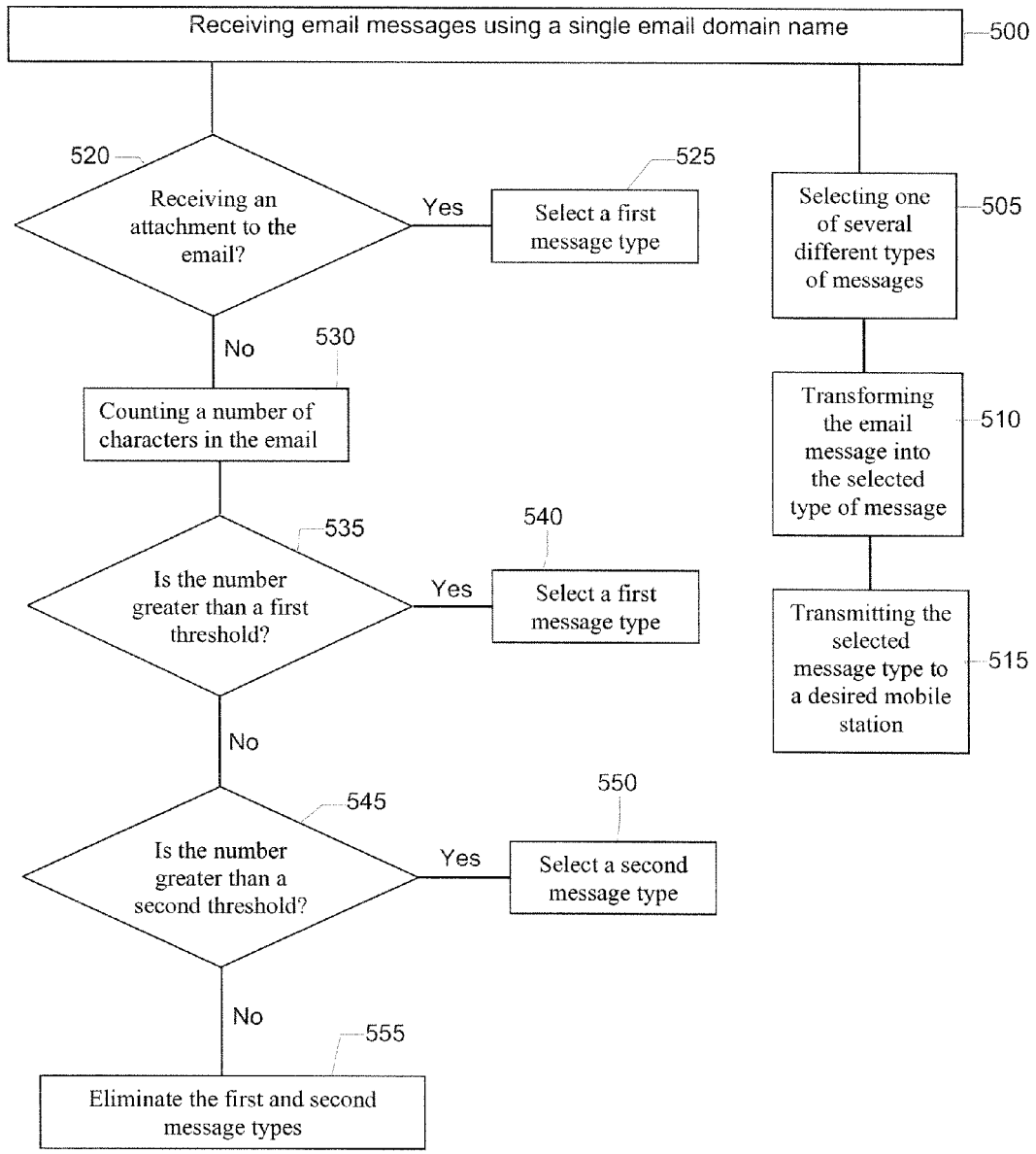
FIG. 5 is a flow diagram describing a further example of the processing of messages by the intelligent messaging system.

FIG. 5 illustrates yet another example of a method of delivering messages sent to a single email domain name. The steps of the method include receiving, at a server, email messages using a single email domain name (step 500) and selecting one of several different types of messages (step 505). In this example, each type of message differs from the other types of messages, (e.g. SMS, EMS, MMS, etc.). The email message can then be transformed into the selected type of message (step 510). Once transformed, the selected message type can be transmitted to a desired mobile station through a message server dependent on the selected type of message (step 515).

In another facet of the example, along with receiving an email message, an attachment to the email can optionally be received (step 520). If the attachment is received, a first message type can be selected (step 525). Alternately, if the attachment is not received, a number of characters in the email message can be counted (step 530). As a result of the count, it is determined if the number of characters is over a first threshold (step 535), and if so, the first message type can be selected (step 540). However, if the number is equal to or less than the first threshold it is then determined if the number of characters is greater than a second threshold (step 545). If the number is greater than the second threshold, a second message type is selected (step 550) and if the number is less than or equal to the second threshold, the first and second message types are eliminated from the selection process (step 555).

A further example of the selecting step can include determining the selected message type based on at least one of a number of factors. Factors can be based solely on whether the email message contains an attachment and, if the attachment is not received, a number of characters in the email message. In another example, one of the factors can be the minimum amount of bandwidth required for transmitting the message while fully delivering the selected message. Another is the maximum amount of efficiency for transforming the email into the selected message, while fully delivering the selected message.

Similar to the above, the first threshold can be approximately 1000 characters and the second threshold is between 140 and 160 characters. Also, the first message type can be a MMS message and the second message type can be an EMS message.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code for the intelligent messaging system. The software code is executable by the general-purpose computer that functions as a web server, application server(s) and/or SMSCs, MMSCs, SMPP GWs, PDSNs, etc. In operation, the code is stored within the general-purpose computer platform. At other times, however, the software may be stored at other locations and/or transported for loading into the appropriate general-purpose computer system. Execution of such code by a processor of the computer platform enables the platform to implement the methodology to analyze messages and create SMS, EMS or MMS messages, in essentially the manner performed in the implementations discussed and illustrated herein.

A wireless mobile communication network between the mobile station 250 and the BSC 260 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile station 150/250 may be capable of conventional voice telephone communications and data communications. A variety of different types of mobile stations supporting such communications are widely available. Today, mobile stations typically take the form of portable handsets, smart-phones or personal digital assistants, although they may be implemented in other form factors.

Figure 6:
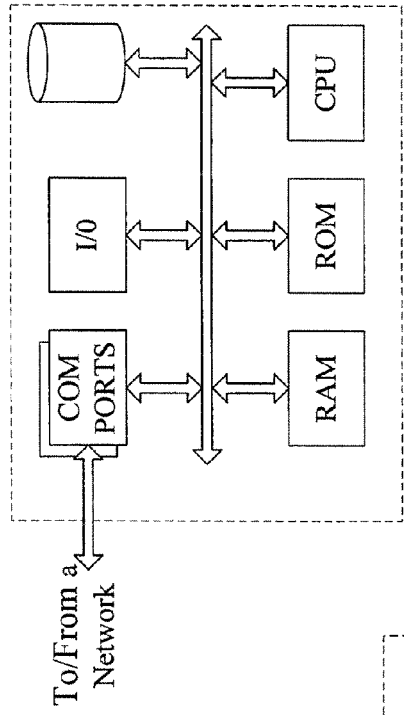
FIG. 6 is a simplified functional block diagram of a computer that may be configured as a host or server, for example, to function as any of the servers in the system of FIGS. 1 and 2.
Figure 7:
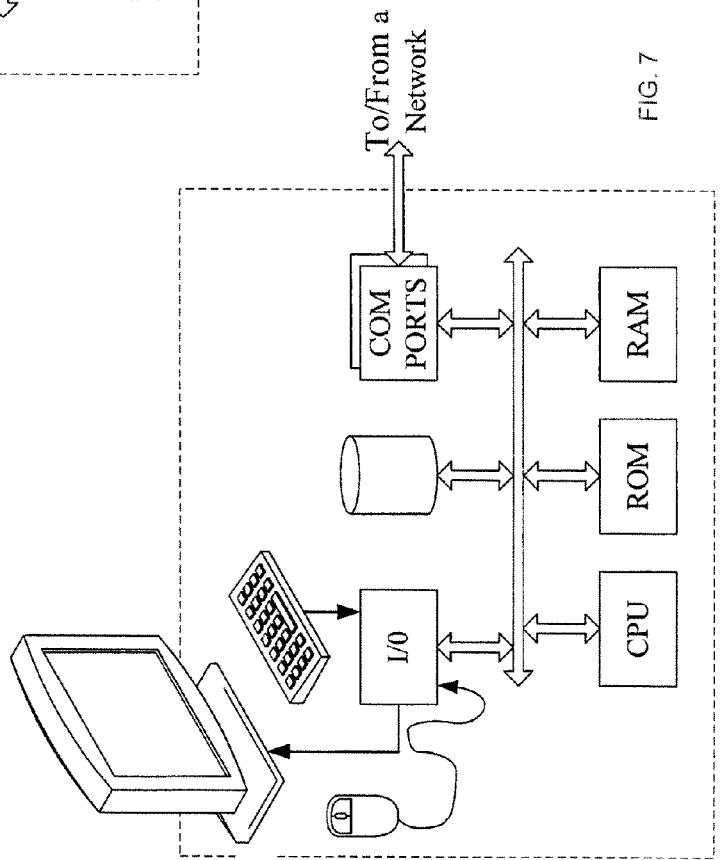
FIG. 7 is a simplified functional block diagram of a personal computer or other work station or terminal device, such as that having an email thereon.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. Of course, the server functions may be implemented in a distributed fashion on a number of similar platforms, to distribute the processing load Hence, aspects of the methods of generating SMS, EMS, and MMS messages, as outlined above, may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable the transmission of the email message. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible, non-transitory "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising steps of:
   receiving for mobile message delivery, by an intelligent messaging system, from a plurality of email clients, email messages directed to a plurality of mobile stations having respective mobile station numbers, each email message using an email address including a mobile station number in combination with a common domain name,
   wherein the common domain name of the email addresses of the email messages is universal to all of the plurality of email messages received by the intelligent messaging system from all of the plurality of email clients:
     1) regardless of a plurality of mobile message types to be delivered by the intelligent messaging system to the plurality of mobile stations, and
     2) regardless of the respective mobile station numbers of the plurality of mobile stations;
   for one of the received email messages having an email address including one of the mobile station numbers in combination with a common domain name:
   determining, at the intelligent messaging system, if the one email message contains an attachment; and
   upon determining that the one email message does not contain the attachment, performing at the intelligent messaging system steps of:
     analyzing the body of the one email message to retrieve a characteristic of the one email message;
     comparing the retrieved characteristic of the one email message to first and second selection criteria;
     determining, among a first, a second, and a third mobile message types, based on the comparison, the mobile message type into which the one email message and the attachment can be most effectively converted;

selecting, based on the determination, one of the first, the second or the third mobile message type into which to convert the body of the one email message;

converting the body of the one email message into the selected first, second, or third mobile message type; and sending the converted message as a mobile message of the selected first, second, or third mobile message type through a mobile communication network to one mobile station of the plurality of mobile stations using the one mobile station number.

2. The method of claim 1, further comprising steps of:

upon determining that the one email message contains the attachment, converting, at the intelligent messaging system, the body of the one email message into the first mobile message type.

3. The method of claim 1, wherein the steps of analyzing, comparing, and converting the body of the one email message comprise steps of:

counting a number of characters in the body of the one email message;

if the number of characters is less than or equal to the first selection criteria set to a first limit, selecting the second mobile message type and converting the body of the one email message to the second mobile message type;

if the number of characters is greater than the first limit and less than or equal to the second selection criteria set to a second limit, selecting the third mobile message type and converting the body of the one email message to the third mobile message type; and if the number of characters is greater than the second limit, selecting the first mobile message type and converting the body of the one email message to the first mobile message type.

4. The method of claim 3, wherein both the subject and body of the one email message are converted into one of the first, second, or third mobile message type, and wherein the number of characters corresponds to the number of characters in the subject and body of the one email message.

5. The method of claim 1, further comprising steps of:

determining an amount of bandwidth required for transmitting a message including the body of the one email message and the attachment; and selecting, based on the determination of the amount of bandwidth, one of the first, second, or third mobile message types.

6. The method of claim 1, wherein:

the first mobile message type is a MMS message type;
the second mobile message type is a SMS message type;
the third mobile message type is an EMS message type;
the first selection criterion is a limit of between 140 and 160 characters; and
the second selection criterion is a limit of approximately 1000 characters.

7. The method of claim 1, further comprising steps of:

transmitting the converted body of the one email message using a protocol corresponding to the selected mobile message type.

8. An article of manufacture, comprising:

at least one machine readable non-transitory storage medium; and programming instructions embodied in said at least one medium for execution by one or more computers, wherein the programming configures said one or more computers to be capable of performing functions for messaging services, the functions comprising functions to:

receive for mobile message delivery, by an intelligent messaging system, from a plurality of email clients, an email messages directed to a plurality of mobile stations having respective mobile station numbers, each email message using an email address including a mobile station number in combination with a common domain name, wherein the common domain name of the email addresses of the email messages is universal to all of the plurality of email messages received by the intelligent messaging system from all of the plurality of email clients:

1) regardless of a plurality of mobile message types to be delivered by the intelligent messaging system to the plurality of mobile stations, and 2) regardless of the respective mobile station numbers of the plurality of mobile station;

for one of the received email messages having an email address including one of the mobile station numbers in combination with a common domain name:

determine, at the intelligent messaging system, if the one email message contains an attachment; and upon determining that the one email message does not contain the attachment, perform at the intelligent messaging system functions to:

analyze the body of the one email message to retrieve a characteristic of the one email message;

compare the retrieved characteristic of the one email message to first and second selection criteria;

determine, among a first, a second, and a third mobile message types, based on the comparison, the mobile message type into which the one email message and the attachment can be most effectively converted;

select, based on the determination, one of the first, the second or the third mobile message type into which to convert the body of the one email message;

convert the body of the one email message into the selected first, second, or third mobile message type; and send the converted message as a mobile message of the selected first, second, or third mobile message type through a mobile communication network to one mobile station using the one mobile station number.

9. The article of claim 8, wherein the programming instructions further configure said one or more computers to perform functions to:

upon determining that the one email message contains the attachment, convert, at the intelligent messaging system, the body of the one email message into the first mobile message type.

10. The article of claim 8, wherein the functions to analyze, compare, and convert the body of the one email message comprise functions to:

count a number of characters in the body of the one email message;

if the number of characters is less than or equal to the first selection criteria set to a first limit, select the second mobile message type and convert the body of the one email message to the second mobile message type;

if the number of characters is greater than the first limit and less than or equal to the second selection criteria set to a second limit, select the third mobile message type and convert the body of the one email message to the third mobile message type; and if the number of characters is greater than the second limit, select the first mobile message type and convert the body of the one email message to the first mobile message type.

11. The article of claim 10, wherein both the subject and body of the one email message are converted into one of the first, second, or third mobile message type, and wherein the number of characters corresponds to the number of characters in the subject and body of the one email message.

12. The article of claim 8, wherein the programming instructions further configure said one or more computers to perform functions to:

determine an amount of bandwidth required for transmitting a message including the body of the one email message and the attachment; and select, based on the determination of the amount of bandwidth, one of the first, second, or third mobile message types.

13. The article of claim 8, wherein the programming instructions further configure said one or more computers to perform functions to:

determine, among the first, second, and third mobile message types, the mobile message type into which the one email message and the attachment can be most efficiently converted; and select, based on the determination, one of the first, second, or third mobile message types.

14. The article of claim 8, wherein:
the first mobile message type is a MMS message type;
the second mobile message type is a SMS message type;
the third mobile message type is an EMS message type;
the first selection criterion is a limit of between 140 and 160 characters; and
the second selection criterion is a limit of approximately 1000 characters.

15. The article of claim 8, wherein the programming instructions further configure said one or more computers to perform functions to:

transmit the converted body of the one email message using a protocol corresponding to the selected mobile message type.

16. A method comprising steps of:

receiving for mobile message delivery, at a server, from a plurality of email clients, email messages directed to a plurality of mobile stations having respective mobile station numbers, each email message using an email address including a mobile station number in combination with a common domain name, wherein the common domain name of the email addresses of the email messages is universal to all of the plurality of email messages received by the server from all of the plurality of email clients:

1) regardless of a plurality of mobile message types to be delivered by the server to the plurality of mobile stations, and 2) regardless of the respective mobile station numbers of the plurality of mobile stations;

for one of the received email messages having an email address including one of the mobile station numbers in combination with a common domain name:

comparing, at the server, a characteristic of the one email message to first and second selection criteria;

determining, among three or more different message types, based on the comparison, the mobile message type into which the one email message and the attachment can be most effectively converted;

selecting, at the server, based on the determination, one of the three or more different types of mobile messages;

transforming the one email message into the selected type of mobile message, and transmitting the transformed message as a mobile message to the one mobile station through a mobile network and a message server associated with the selected type of mobile message, using the one mobile station number.

17. The method of claim 16, further comprising the steps of:

receiving at the server, an attachment to the one email message; and if the attachment is received, selecting a first mobile message type.

18. The method of claim 16, wherein the characteristic of the one email message is a number of characters in the one email message, and wherein first and second selection criteria are different threshold numbers of characters.

19. A method comprising steps of:

receiving for mobile message delivery, by an intelligent messaging system, from a plurality of email clients, email messages directed to a plurality of mobile stations having respective mobile station numbers, each email message using an email address including a mobile station number in combination with a common domain name, wherein the common domain name of the email addresses of the email messages is universal to all of the plurality of email messages received by the intelligent messaging system from all of the plurality of email clients:

1) regardless of a plurality of mobile message types to be delivered by the intelligent messaging system to the plurality of mobile stations, and 2) regardless of the respective mobile station numbers of the plurality of mobile stations;

for one of the received email messages having an email address including one of the mobile station numbers in combination with a common domain name:

generating a first message from a combination of a subject of the one email message and a body of the one email message;

based on whether the one email message contains an attachment, determining a set of mobile message types into which to convert the first message from different sets of mobile message types, wherein the set of mobile message types for an email message that does not contain an attachment has a plurality of mobile message types;

upon determining that the one email message does not to contain an attachment, counting a number of characters in the first message:

determining, among the plurality of mobile message types, the mobile message type into which the one email message and the attachment can be most effectively converted;

selecting, based on the determination, one mobile message type among the plurality of mobile message types;

converting the first message into the selected mobile message type; and sending the converted message as a mobile message through a mobile network to the one mobile station using the one mobile station number.

20. The method of claim 19,
wherein the set of mobile message types for the one email message that does contain an attachment has a single mobile message type,
the method further comprising a step of:
converting the first message into the single mobile message type when the one email message is determined not to contain an attachment.

21. The method of claim 19, wherein the plurality of message types comprises at least three mobile message types, and wherein each of the at least three mobile message types is associated with a different non-overlapping range of number of characters.

* * * * *